United States Patent [19]
Ono et al.

[11] Patent Number: 6,059,460
[45] Date of Patent: May 9, 2000

[54] PLAIN BEARING

[75] Inventors: Akira Ono; Hideyumi Matsumura; Masayuki Niwa; Shoji Nawa; Takayuki Shibayama, all of Nagoya, Japan

[73] Assignee: Daido Metal Company Ltd., Nagoya, Japan

[21] Appl. No.: 09/038,826

[22] Filed: Mar. 12, 1998

[30] Foreign Application Priority Data

Mar. 18, 1997 [JP] Japan ................................ 9-085909

[51] Int. Cl.[7] ............................ F16C 1/00; F16C 33/02
[52] U.S. Cl. ........................ 384/322; 384/625; 384/283
[58] Field of Search ................................ 384/283, 286, 384/291, 292, 322, 100, 114, 107, 625, 373, 398, 276

[56] References Cited

U.S. PATENT DOCUMENTS

| | | | |
|---|---|---|---|
| 3,138,413 | 6/1964 | Woody | 384/625 |
| 3,386,783 | 6/1968 | Scheufler | 384/625 |
| 4,834,400 | 5/1989 | Lebeck | 384/625 X |

FOREIGN PATENT DOCUMENTS

| | | |
|---|---|---|
| 5973620 | 4/1984 | Japan . |
| 6353922 | 4/1988 | Japan . |
| 6362621 | 4/1988 | Japan . |
| 731435 | 6/1955 | United Kingdom . |

*Primary Examiner*—David A. Bucci
*Assistant Examiner*—Marcus Charles
*Attorney, Agent, or Firm*—Browdy and Neimark

[57] ABSTRACT

There are provided a plain bearing which is excellent in oil retaining property and wear-resistant property. The plain bearing has a number of fine grooves which are formed in the circumferential direction on each of the inner surfaces of semi-cylindrical bearing metals. Lands are defined as portions of the plain bearing which are left between the fine grooves. The lands comprise higher projecting lands and lower projecting lands. With this arrangement, a rotating shaft is supported by the higher projecting lands and a large amount of lubricating oil can be retained between the higher projecting land and the next higher projecting land thereto. Consequently, the bearing and its associated rotating parts can be prevented from the possible seizure in the running-in period at the early stage when using the bearing, which is liable to cause the seizure in particular. Even when frictional wear of the higher projecting lands is in progress, because of a large amount of lubricating oil retained in the fine grooves between the adjacent lower projecting lands, the plain bearing is excellent in anti-seizure property and wear-resistant property.

13 Claims, 3 Drawing Sheets

PLAIN BEARING

BACKGROUND OF THE INVENTION

This invention relates to a cylindrical plain bearing for rotatably supporting a rotating shaft.

A plain bearing for rotatably supporting a rotating shaft is formed to a cylindlical shape so as to be fitted on the inner surface of a housing. Frictional wear and seizure of this plain bearing are suppressed by the lubricating effect and cooling effect of the lubricating oil, which are supplied into a clearance between the inner surface of this plain bearing and the rotating shaft, and the noise suppressing effect can also be brought about by the buffer or damper action of the lubricating oil. As the thickness of an oil film to be formed between the inner surface of the plain bearing and the rotating shaft becomes thicker, that is to say, as the amount of the lubricating oil further increases, the above-mentioned suppressing effect produces good results.

In order to increase the amount of the lubricating oil to be retained, it had been made to provide a plain bearing having a number of fine grooves which are circumferentially formed on the inner surface of the bearing, the fine grooves being parallel with one another and being arranged to extend at intervals in the axial direction of the bearing, the inner surface comprising the fine grooves and lands which are defined as portions of the bearing left between the fine grooves, the fine grooves and the lands being arranged at intervals in the axial direction of the bearing, the fine grooves having a depth of several micro meters ($\mu$m).

JP-A-59-73620 discloses a plain bearing having a number of fine grooves which are circumferentially formed on the whole inner surface of the bearing, the fine grooves being arranged at intervals in the axial direction of the bearing and being inclined at an angle of 0 to about 5 degrees relative to the circumferential direction of the bearing. This arrangement allows a large amount of lubricating oil to be supplied into the fine grooves, thereby promoting the heat dissipation (Prior Art 1).

JP-U-63-62621 discloses a plain bearing having fine grooves which are circumferentially formed on the inner surface of the bearing, the fine grooves being arranged to extend at intervals in the axial direction of the bearing, the fine grooves in the vicinity of both ends of bearing metals being arranged in a deeper depth than those of the axial central portion of the bearing metals so that a large amount of lubricating oil can be retained in the vicinity of the both ends. With this arrangement, the amount of the lubricating oil is increased in the vicinity of the both ends, where the bearing is subjected to a high shock loading caused by a partial contact of a rotating shaft, thereby suppressing the heat generation in the both ends of the bearing (Prior Art 2).

JP-U-63-53922 discloses a plain bearing having a number of fine grooves which are circumferentially formed on the surface of the bearing, the fine grooves being arranged to extend at intervals in the axial direction of the plain bearing, thereby having a large proportion of sliding surface area which is obtained by making the fine grooves in the vicinity of both ends of bearing metals in a larger pitch than those of the axial central portion of the bearing metals. With this arrangement, the lowering in the durability of the bearing is intended to be suppressed by reducing the number of the fine grooves in the vicinity of the both ends of the bearing metals, where the rotating shaft is in partial contact with the bearing metals, thereby preventing the decrease in the area which is subjected to the axial loading due to the formation of the fine grooves, as much as possible, so as to reduce the specific load (Prior Art 3).

In these Prior Arts 1 to 3, every plain bearing has a number of fine grooves which are circumferentially formed on the inner surface of the bearing, the fine grooves being arranged to extend at intervals in the axial direction of the bearing, the inner surface having continuous fine grooves and lands the latter of which are defined as portions of the bearing left between the fine grooves. Each of the lands may offer a resistance when the lubricating oil outflowing in the axial direction of the bearing, to thereby prevent an inflow pressure from dropping when the lubricating oil flowing into a clearance between the inner surface and the rotating shaft and also allow a large amount of lubricating oil to flow through the fine grooves so as to promote the heat dissipation.

However, in these Prior Arts, because every plain bearing is configured to have the same height lands which are obtained by forming the fine grooves, the lands did not sufficiently function as the resistance when the lubricating oil outflowing in the axial direction of the bearing, or the conformability between the rotating shaft, the lands and the fine grooves recesses was not sufficient in use.

SUMMARY OF THE INVENTION

With the above-mentioned problems in view, upon paying attention to the configuration or shape of the fine grooves which are formed in the circumferential direction on the inner surface of the plain bearing, that is to say, the lands which are defined between the fine grooves, it is an object of the present invention to provide a plain bearing which has excellent properties, particularly in oil retaining property and conformability.

According to a feature of the present invention, there is provided a plain bearing having a number of fine grooves which are circumferentially formed on the inner surface of the plain bearing, the fine grooves being parallel with one another and being arranged to extend at predetermined intervals in the axial direction of the plain bearing, wherein lands are defined as portions of the plain bearing which are left between the fine grooves, the fine grooves and the lands being arranged to extend at intervals in the axial direction of the bearing, the lands comprising higher projecting lands and lower projecting lands.

With this arrangement, when the bearing is used as a plain bearing, since the rotating shaft is supported by the higher projecting lands, a large amount of lubricating oil is retained between the higher projecting lands. As a result, the possible seizure of the bearing and its associated rotating parts, which is liable to take place in particular during the running-in period in the early stage when using the bearing, can be prevented, therby providing a plain bearing which is excellent in anti-seizure property.

According to another feature of the present invention, there is provided a plain bearing having a number of fine grooves which are circumferentially formed on the inner surface of the plain bearing, the fine grooves being parallel with one another and being arranged to extend at predetermined intervals in the axial direction of the plain bearing, wherein higher projecting lands are formed in the vicinity of both axial ends of the plain bearing.

With this arrangement, the effect for suppressing seizure of the bearing and its associated rotating parts can be enhanced. Further, even when frictional wear of the higher projecting lands is in progress during a long time use, a large amount of lubricating oil can be retained between the lower projecting lands, thereby providing a plain bearing which is excellent in the anti-seizure property and the wear-resistant property.

According to still another feature of the present invention, there is provided a plain bearing having a number of fine grooves which are circumferentially formed on the inner surface of the plain bearing, the fine grooves being parallel with one another and being arranged to extend at predetermined intervals in the axial direction of the plain bearing, wherein a number of higher projecting lands are formed in the vicinity of both axial ends of the plain bearing, while a number of lower projecting lands are formed in the axial central portion of the plain bearing.

With this arrangement, the plain bearing is excellent in comformability, and also since the local specific load in both axial ends, which ends are liable to be subjected to a high local specific load caused by a partial contact of the rotating shaft, is reduced, thereby making it possible to further increase the wear-resistant property of the bearing.

DETAILED DESCRIPTION OF THE PREFERRED EMBODIMENTS

Plain bearings for use in crank shafts of gasoline engines rotating at high speeds, in which two pieces of bearing metals 10a, 10b each having a semi-cylindrical shape are combined into an assembly having a cylindrical shape, will be described in detail hereinbelow.

Figure 1:
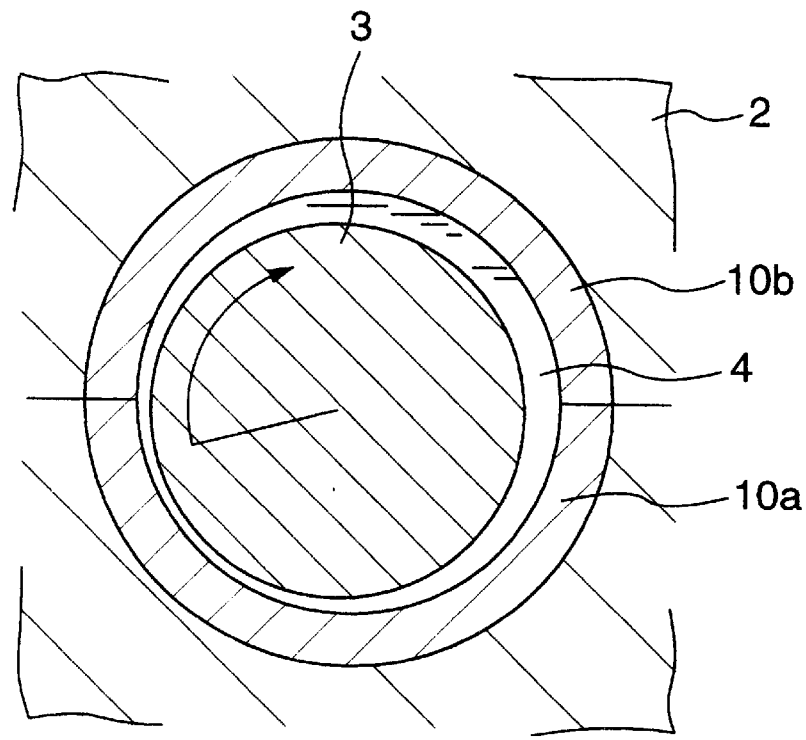
FIG. 1 is a sectional view showing a condition when using a plain bearing.

FIG. 1 shows the condition when two pieces of bearing metals 10a, 10b are combined into an assembly having a cylindrical shape which is fitted in a housing 2 of a plain bearing. The clearance between the bearing metals 10a, 10b and a rotating shaft 3 is supplied with lubricating oil 4. The inner surface of the bearing metal 10a which is put to use in this manner is lined with a sliding material such as, for example, a copper alloy, an aluminum alloy, a tin alloy, or a lead alloy, in order to satisfy the bearing properties of the plain bearing such as the wear-resistant property and the like, and also may be overlaid with a tin alloy, a lead alloy, or a synthetic resin, if need be.

Figure 2:
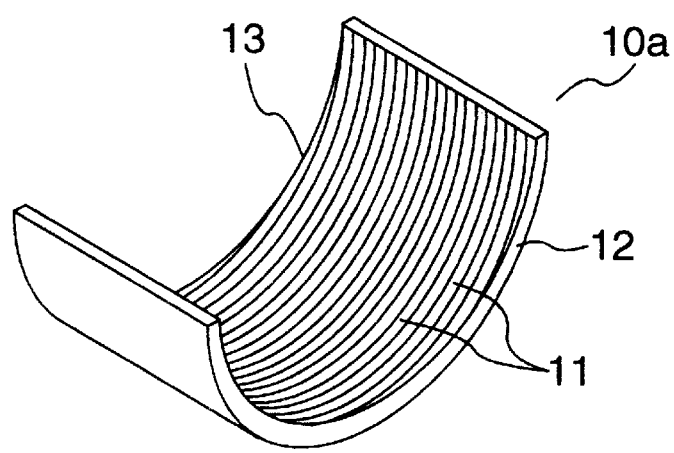
FIG. 2 is a perspective view of a bearing metal.

Further, as shown in FIG. 2, each of the inner surfaces of the bearing metals 10a, 10b has a plurality of fine grooves 11 which are circumferentially spirally formed on the inner surface of the bearing metals between both axial ends thereof, the fine grooves being parallel with one another and being arranged in the direction inclined at an angle of 3 degrees relative to the circumferencial direction perpendicular to the axial direction of the bearing. Further, the fine grooves 11 are formed either by boring work or by photo-etching. In case of forming the fine grooves 11 by boring work, a plurality of grooves 11 are formed by means of either one cutting tool having one or more cutting edges adapted to cut a plurality of grooves simultaneously, or a combination of a plurality of cutting tools. By forming the fine grooves 11 in this manner, in the axial direction of the bearing metal 10a, there are repeatedly formed a plurality of groups comprising two higher projecting lands 15, 15 each having a height H of 4 micro meters ($\mu$m), and three consecutive lower projecting lands 16, 16, 16 between the former lands 15, 15, each of the latter lands 16 having a height h of 2 micro meters ($\mu$m) (Refer to FIG. 3). Fine grooves whose depths range within a tolerance which is unavoidable due to industrial processing (for example, micrometers ($\mu$m) for a bearing having a diameter of 50 mm) are to be regarded as being at the same level in terms of groove depth.

Figure 4:
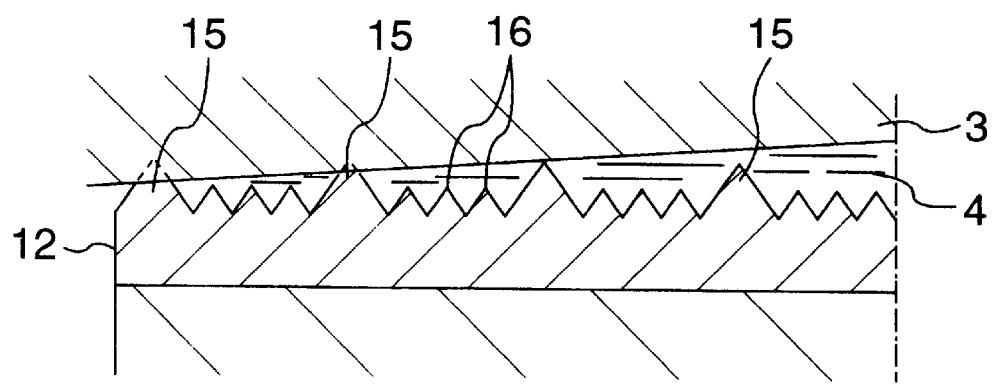
FIG. 4 is a sectional view of a portion of a bearing metal showing the working thereof.

As shown in FIG. 4, when the bearing metal 10a is fitted to the housing 2, and then put to use, during the initial running-in, not only a large amount of lubricating oil is retained between one higher projecting land 15 and the next higher projecting land 15 thereto in the clearance between the plain bearing and the rotating shaft 3, but also, in particular, each of the higher projecting lands 15 functions as a bank, as a result the lubricating oil 4 is prevented from spilling out in the axial direction of the bearing metal 10a and an inflow pressure when the lubricating oil flowing into the clearance is increased, thus a stable thick oil film having a high oil pressure is formed. The possible seizure of the bearing metals, which is liable to occur in particular during the initial running-in period, can be suppressed by virtue of the presence of such a stable thick oil film.

Moreover, after the completion of the running-in of the plain bearing, as the plain bearing is further used, even when a portion of the higher projecting land 15 has been worn out, since a certain amount of lublicating oil is retained in each of the fine grooves where some lower projecting lands are continuously formed, thereby a large amount of lubricating oil 4 is retained in the overall fine grooves between the lower projecting lands 16, a high inflow pressure required for forming into the thick oil film is maintained to thereby enable a stable oil film to be maintained, thus ensuring that the excellent wear-resistant property of the bearing is brought about during a long time. In particular, in this embodiment, the area which is subjected to the axial loading will be increased as the higher projecting lands 15 and the lower projecting lands 16 are worn out, so that the excellent wear-resistant property of the plain bearing will be maintained over a long time.

Figure 3:
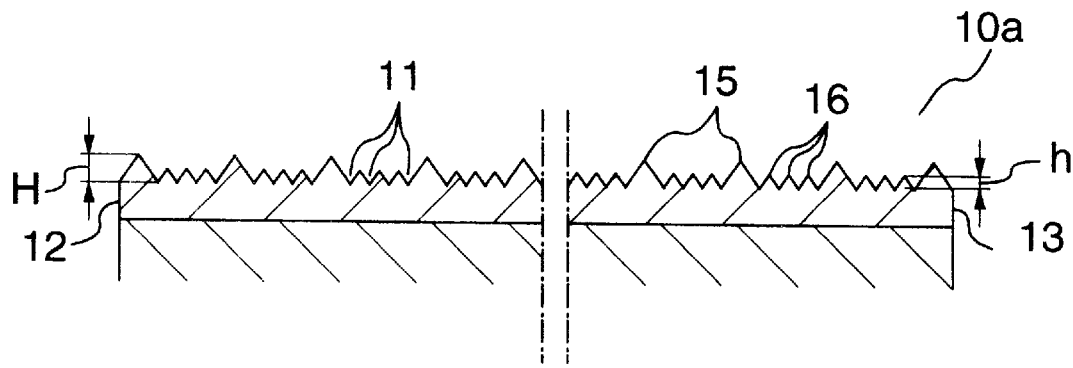
FIG. 3 is a sectional view of a portion of a bearing metal according to an embodiment of the present invention.

Further, the longitudinal sectional shapes of the higher projecting lands 15 and the lower projecting lands 16 are not limited to the inverse-V shape as shown in FIG. 3, but may be carried out by appropriately modifying them as described hereinbelow.

Figure 5:
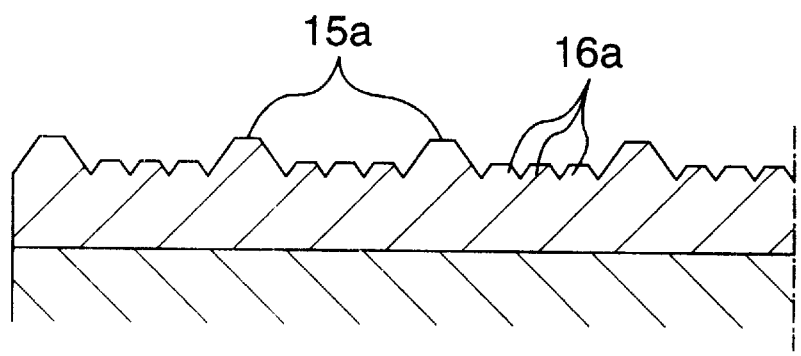
FIG. 5 is a sectional view of a portion of a bearing metal according to another embodiment of the present invention.

FIG. 5 shows another embodiment of the plain bearing in which each of the higher projecting lands 15a and the lower projecting lands 16a has a flat top surface to thereby increase the area which is subjected to the axial loading more than that of the embodiment as shown in FIG. 3, thus increasing the wear-resistant property of the plain bearing. Therefore, there is provided a plain bearing which is excellent in wear-resistant property, particularly under a high load.

Figure 6:
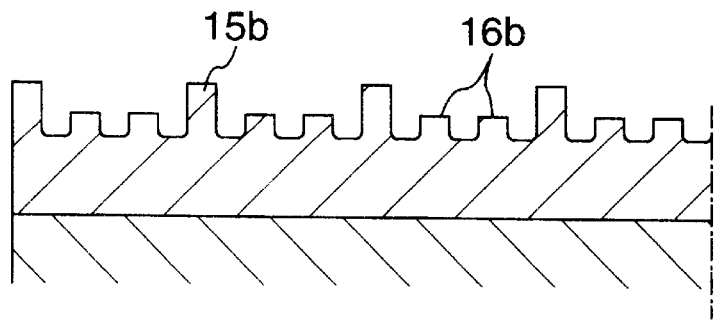
FIG. 6 is a sectional view of a portion of a bearing metal according to a still another embodiment of the present invention.

FIG. 6 shows still another embodiment of the plain bearing in which higher projecting lands 15b and lower projecting lands 16b are formed on the inner surface of the bearing while each of the higher and less highly projecting lands 15b, 16b has a flat top surface and each of the fine grooves formed between the adjacent higher and lower projecting lands 15b, 16b and between the adjacent lower projecting lands 16b has a flat bottom surface. In this embodiment, both the higher projecting lands 15b and the lower projecting lands 16b are formed at intervals of the same pitch, and also a larger amount of lubricating oil can be retained in the fine grooves between the lower projecting lands 16b than that of the embodiment as shown in FIG. 3. Consequently, this embodiment may provide a plain bearing which is more suitable for a rotating shaft adapted to be rotated at a high speed than that of the embodiement as shown in FIG. 3. Further, after the higher projecting lands 15b will have been worn out by wear and tear, untill the lower projecting lands 16b are also flattened up to be smooth, the area which is subjected to axial loading remains unchanged, so that there is provided a plain bearing which is capable of maintaining a stable bearing property.

Figure 7:
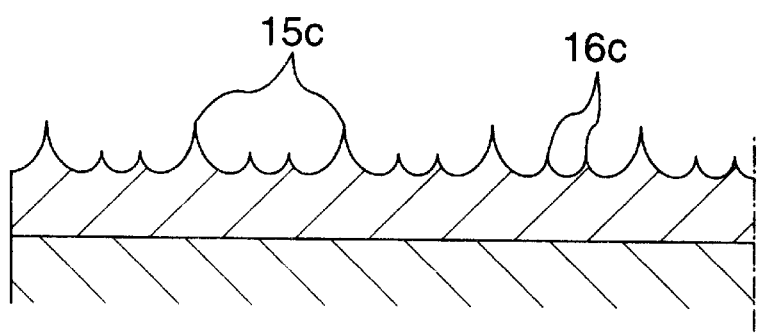
FIG. 7 is a sectional view of a portion of a bearing metal according to a further embodiment of the present invention.

FIG. 7 shows a further embodiment of the plain bearing in which both of higher projecting lands 15c and lower projecting lands 16c are formed by two circular arcs. This embodiment enables a larger amount of lubricating oil to be retained in the fine grooves between the higher projecting land 16c and the next higher projecting land 16c thereto more than that of the embodiment as shown in FIG. 3. Therefore, this embodiment may provide a plain bearing which is more suitable for a rotating shaft adapted to be rotated at a high speed than that of the embodiment as shown in FIG. 3.

Figure 8:
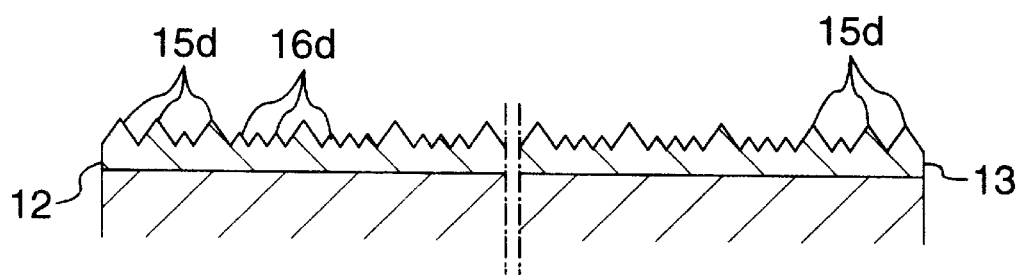
FIG. 8 is a sectional view of a portion of a bearing metal according to a still further embodiment of the present invention.

FIG. 8 shows a still further embodiment of the plain bearing in which the number of higher projecting lands 15d which are formed in the vicinity of both axial ends 12, 13 of the inner surface of the bearing, is greater while the number of lower projecting lands 16d which are formed in the axial central portion on the inner surface of the bearing is greater. By increasing the number of the higher projecting lands 15d in the vicinity of both axial ends 12, 13 which are liable to be subjected to a high local specific load caused by a partial contact of the rotating shaft during the running-in, the sliding surface area between the inner surface of the plain bearing and the rotating shaft 3 may be increased, thereby reducing the possible frictional wear of both axial ends 12, 13 still more.

Figure 9:
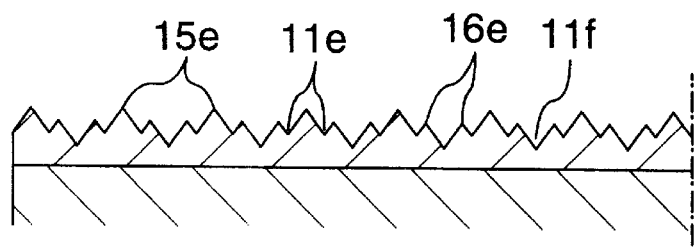
FIG. 9 is a sectional view of a portion of a bearing metal according to an yet further embodiment of the present invention.

FIG. 9 shows a yet further embodiment wherein different height projecting lands such as higher projecting lands 15e and lower projecting lands 16e are formed, and also shallow grooves 11e and deep grooves 11f are formed. This may provide a plain bearing which allows a larger amount of lubricating oil to be retained in the grooves between the projecting lands than that of the embodiment as shown in FIG. 3. Therefore, this embodiment provides a plain bearing which is more suitable for a rotating shaft adapted to be rotated at a high speed than that of the embodiment as shown in FIG. 3.

While a number of preferred embodiments of the present invention have been described hereinabove, it is possible to appropriately select the height of the higher projecting lands and the lower projecting lands and the pitch therebetween and thus combine them. Further, the number of the lower projecting lands to be formed between the higher projecting land and the next higher projecting land thereto may also be selected suitably.

Moreover, in a case wherein an overlay made of a lead alloy, a tin alloy, an alminum alloy or a synthetic resin is formed in an uneven manner on the inner surface of the bearing, or in a case wherein various grooves having the similar section shape to those of the above-mentiond embodiments are formed on the inner surface of the bearing, the same effects as mentioned above may be obtained.

Although the present invention has been described with reference to the preferred embodiments, those skilled in the art will recognize that changes and modifications thereof may be made in the form and details without departing from the spirit and scope of the present invention described in the appended claims.

What is claimed is:

1. A plain bearing defining an axial direction and including a bearing surface comprising:
   circumferential fine grooves being substantially parallel with one another and spaced in the axial direction generally at a predetermined groove interval, the grooves including groove bottoms all being approximately equal in a groove depth; and
   circumferential lands defined between adjacent pairs of the grooves, whereby the lands are spaced in the axial direction;
   wherein the lands include a set of higher-projecting lands and a set of lower-projecting lands, being arranged in a regular pattern in the axial direction.

2. The plain bearing according to claim 1, wherein the higher-projecting lands are disposed adjacent both axial ends of the plain bearing.

3. The plain bearing according to claim 2, wherein a large number of the lower-projecting lands are disposed in an axially central portion of the plain bearing.

4. The plain bearing according to claim 1, wherein a large number of the lower-projecting lands are disposed in an axially central portion of the plain bearing.

5. The plain bearing according to claim 1, wherein the lands are arranged in groups, and each group comprises a first number of higher-projecting lands and a second number of lower-projecting lands.

6. The plain bearing according to claim 5, wherein the first number is 1.

7. The plain bearing according to claim 5, wherein the second number is 3.

8. The plain bearing according to claim 5, wherein the second number is 2.

9. The plain bearing according to claim 1, wherein the higher-projecting lands have a greater height above the groove bottoms of approximately 4 $\mu$m and the lower-projecting lands have a lesser height above the groove bottoms of approximately 2 $\mu$m.

10. A plain bearing having a plurality of grooves which are circumferentially formed on the surface of said plain bearing,
   the grooves being cut into said surface and parallel with one another and being arranged to extend at predetermined intervals in the axial direction of said plain bearing, each said groove having a top and a bottom with the tops of said grooves being at two different levels and the bottoms of said grooves being at the same level,
   the tops of said grooves defining first and second lands which comprise portions of said plain bearing which are left between the grooves,
   the grooves and the first and second lands being arranged in the axial direction of the bearing, said tops of said grooves at two different levels comprising said first lands which are higher projecting and said second lands which are lower projecting, and wherein said cut parallel grooves are arranged in a regular pattern in the axial direction.

11. The plain bearing according to claim 10 in which said grooves are fine grooves having a depth of several micrometers.

12. The plain bearing according to claim 11, wherein said higher projecting lands are located at the vicinity of the axial ends of said plain bearing.

13. The plain bearing of claim 12 wherein a plurality of said higher projecting lands are located in the vicinity of the axial ends of said plain bearing, while a plurality of said lower projecting lands are formed in the axial central portion of said plain bearing.

* * * * *